United States Patent [19]

Cornely et al.

[11] Patent Number: 4,475,847

[45] Date of Patent: Oct. 9, 1984

[54] PROCESS FOR CONSOLIDATION AND SEALING OF GEOLOGICAL FORMATIONS AND ARTIFICIAL BEDS OF ROCK, EARTH, AND COAL

[75] Inventors: Wolfgang Cornely, Gladbeck; Hans Mehesch; Frank Meyer, both of Essen; Rolf Kubens, Odenthal; Martin Winkelmann, Leverkusen, all of Fed. Rep. of Germany

[73] Assignees: Bergwerksverband GmbH, Essen; Bayer Aktiengesellschaft, Leverkusen, both of Fed. Rep. of Germany

[21] Appl. No.: 423,357

[22] Filed: Sep. 24, 1982

[30] Foreign Application Priority Data

Oct. 3, 1981 [DE] Fed. Rep. of Germany ....... 3139395

[51] Int. Cl.$^3$ .................... E21B 33/138; C08G 18/76; E02B 3/12
[52] U.S. Cl. ................................. 405/264; 166/295; 299/11; 405/261; 521/174; 521/176; 523/130; 523/131; 523/132
[58] Field of Search ....................... 523/130, 131, 132; 166/295; 299/11; 405/264; 521/174, 176

[56] References Cited

U.S. PATENT DOCUMENTS

| 2,889,883 | 6/1959 | Santora | 166/295 |
| 3,337,476 | 8/1967 | Vandenberg | 521/174 |
| 3,367,892 | 2/1968 | Jorczak et al. | 166/295 |
| 3,882,684 | 5/1975 | Meyer et al. | 405/264 |
| 4,113,014 | 9/1978 | Kubens et al. | 166/295 |
| 4,114,382 | 9/1978 | Kubens et al. | 405/264 |
| 4,129,697 | 12/1978 | Schäpel et al. | 521/176 |
| 4,256,846 | 3/1981 | Ohashi et al. | 521/176 |

FOREIGN PATENT DOCUMENTS

| 61058 | 9/1982 | European Pat. Off. | 521/176 |
| 1485892 | 9/1977 | United Kingdom . | |

Primary Examiner—Ronald W. Griffin
Attorney, Agent, or Firm—Gene Harsh; Joseph C. Gil; Thomas W. Roy

[57] ABSTRACT

For consolidation of geological formations and artificial beds of rock, earth, and coal by means of foaming and hardening polyisocyanate/polyol blends, diols with secondary hydroxyl functions of the OH number range 150–1000 are used as diol component. Preferably a crude polyisocyanate blend (MDI) obtained by phosgenation of aniline/formaldehyde condensates which at ambient temperature assumes a liquid state, and the liquid prepolymers of said crude MDI are used as isocyanate components.

11 Claims, No Drawings

PROCESS FOR CONSOLIDATION AND SEALING OF GEOLOGICAL FORMATIONS AND ARTIFICIAL BEDS OF ROCK, EARTH, AND COAL

Consolidation and sealing of geological formations and artificial beds of rock, earth, and coal is practised to a large extent by means of polyurethane systems.

Normally two-component polyurethane systems are injected into the formations to be consolidated. These systems consist of commercial polyisocyanates blended with polyols of a molecular weight ranging between 350 and 400. According to German Pat. No. 24 36 029 (corresponding to U.S. Pat. No. 4,114,382) the polyol component of such systems comprises from 5 to 50% by weight of a polyether polyol having an OH-number of below 100 and which has been prepared by reacting a starting compound containing more than one reactive hydrogen atom per molecule with an excess of 1,2-alkylene oxides. The use of such polyether polyols leads to improved glueing properties of the systems.

The high degree of consolidation by binding e.g. rock strata or individual coal particles was effected in all cases by application of polyols with highly branched molecule chains since only from these polyols an intense cross linking with the polyisocyanates, thus the formation of a foam exhibiting a high degree of hardness, and consequently the formation of correspondingly hard and stable glueing surfaces and bridges between the rock or coal particles to be bound, may be expected. Flexibly glued interfaces as e.g. obtained by formation of a softer polyurethane foam do not make sense when looking at the task of conferring to integral rock or coal formations a high degree of tenacity and a strongly increased coherence.

As to be seen from e.g. German Offenlegungsschrift 24 48 958 up to now highly branched polyether polyols were used in the practice for such consolidation, in particular polyether polyols obtained by propoxylation of trimethylol propane such as the compound of the formula

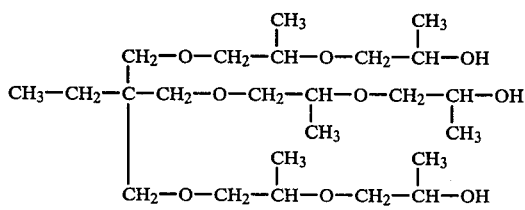

Surprisingly it was found now that when practising the process for consolidation and sealing of geological formations and artificial beds of rock, earth, and coal that considerable advantages were achieved, in many aspects, by proceeding according to the process of the present invention.

The present invention relates to a process for consolidation of geological formations and artificial beds of rock, earth, and coal by means of foaming and hardening polyisocyanate/polyol blends, characterized in that diols with secondary hydroxyl functions of the OH number range 150-1000 are used.

The polyols which are used according to the process of the invention are propoxylation products of difunctional starter molecules such as e.g. ethylene glycol, butanediol-1,2, butanediol-1,4, aniline and preferably propylene glycol and water. Polypropylene glycols of the formula

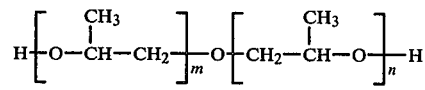

where
m and n stand for an integral number from 1 to 12
and where the sum of m+n=2-13,
are preferably used.

The diols which are used according to the process of the invention are considerably more compatible with respect to the isocyanates to be considered than the branched polyols which constitute current state of technology. Now, after a short period of time, polyisocyanate/polyol systems are obtained which constitute a completely homogeneous blend which shows no subsequent separation of its constituents. This advantage is important for successful permeation of the blends up into the finest fissures of the formations to be consolidated. Since there is no subsequent separation of constituents quantitative use is made of the injected components for the formation of the polyurethane.

On the other hand the blends made up from polyisocyanates and branched polyols used up to the present require approximately a by 5 to 20 times higher mixing time to lead to homogeneous emulsions which, however, at least partially, demulsify fastly so that a complete reaction between the components cannot always take place in the fissures of the formation treated.

Another advantage of the invention is that the reactive blends to be used according to the invention are considerably less viscous than blends known up to present. Their viscosity ranges generally below 100 mPa.s./25° C. The injection into the formations to be consolidated and the penetration of the blend into the smallest fissures can thus be assured at pressures of only 10 to (max) 25 bar while by use of the systems known up to present no comparable consolidation results can be obtained even with pressures in the range of 80 to 100 bar.

Furthermore, for improved flexibility certain softening agents were added to the systems up to present as e.g. castor-oil or polyether with an OH number below 100. The systems covered by this invention exhibit the advantage that such softeners become partly or completely superfluous.

It is possible to blend the diols to be used according to the invention with up to 75% by weight preferably up to 40% by weight based on the total quantity of polyol with other polyols containing ester or ether functions known from polyurethane chemistry. These are in particular propoxylation products of tri- or multi-functional starter molecules as e.g. alkoxylation products of trimethylol propane, glycerin, saccharose, amines as e.g. ammonia, ethylene diamine as well as castor-oil and polyester polyols. Such additives affect the success of the process covered by this invention only little or insignificantly.

The quantitative ratio of the polyol component/isocyanate blend may be varied over a wide range and preferably the components are used in an amount corresponding to a molar NCO/OH-ratio of from 0.5:1 to 3:1 preferably 0.8:1 to 2:1. Generally, the injection systems are designed for a polyisocyanate/polyol blending ratio (by volume) of 1:1.

The crude polyisocyanates—liquid at ambient temperature—known from polyurethane chemistry, as produced by aniline/formaldehyde condensation and subsequent phosgenation, may be taken as polyisocyanate component. Also the modification products of such polyisocyanate blends of the isocyanate series, e.g. their derivates containing carbodiimide functions, biuret functions, urethane functions or allophanate functions, are suited. Such polyisocyanates are described i.a. in "Ullmann's Encyklopädie der technischen Chemie", Verlag Chemie, 4. Auflage, Band 19, pages 303 to 304.

Polyisocyanate blends—liquid at ambient temperature—produced by phosgenation of aniline/formaldehyde condensation products (these blends essentially consist of isomer diisocyanatodiphenyl methanes and their oligomer homologous, "MDI") are particularly suited since these isocyanates exhibit an average functionality of 2.1 to 3.5, preferably 2.2 to 2.8, and since a functionality within this range is necessary for a thorough cross-linking with the linear polyols.

Liquid prepolymers of MDI i.e. reaction products of MDI with polyvalent alcohols at a molar NCO/OH-ratio of from 1:0.005 to 1:0.3, preferably 1:0.005 to 1:0.1 are equally among the prefered polyisocyanate components of the invention. Polyvalent alcohols which may be used for this modification of MDI exhibit a molecular weight of from 62 to 3000, preferably of from 134 to 3000 and most preferably of from 134 to 700. The polyether alcohols of polyurethane chemistry are especially suitable for this purpose. Among the preferred polyols to modify MDI are polypropylene glycols having a molecular weight of from 134 to 700.

For allowing the blends to be used according to the invention to harden without being affected by larger quantities of water e.g. in aquiferous rock strata, it is recommended to add up to 2% by wt. of catalysts known from polyurethane chemistry to said blend, preferably metalloorganic compounds as e.g. dibutyl-tin dilaurate, tin octoate or tertiary amines as e.g. triethylamine or amine blends containing metallo-organic compounds. The addition of the known foam stabilizers such as of polydimethylsiloxane-polyoxyalkylene-block polymers for the same purpose is also advantageous (see also German Offenlegungsschrift 24 48 958).

For better foaming of the blend known foaming agents as e.g. monofluoro trichloromethane, dichlorodifluoromethane, methylene chloride, aceton, butane, pentane etc. may be added to the system or preferably to the polyol by up to 30% by wt. Alternatively water may be added in quantities of up to 3% by wt. relative to the total polyols quantity.

The process covered by this invention is practised by known methods which are actual state of technology, i.e. by injecting the blends covered by this invention into the formations to be consolidated by several boreholes which might be e.g. 2 m deep and of 45 mm diameter. Normally the boreholes are plugged, an injection tube leads through the plug into the borehole, and, after the injection cycle is completed, the injection tube is retracted. The plug then closes automatically just like a valve. Injection can be carried out at pressures of up to more than 100 bar; excessive pressure, however, may result in coal or rock breaking off.

As is well known, polyurethane may be introduced into rock or coal fromations by means of two-chamber cartridges (see e.g. German Pat. No. 1,758,185) containing separately the isocyanates and the mostly aqueous polyols. The cartridges are introduced into the boreholes, destroyed, and then the boreholes are plugged. The polyurethane foam formed in the borehole due to the chemical reaction between water and isocyanate penetrates, under the pressure built up in the borehole, into the fissures of the peripheral zones of said borehole, and then cures so that exclusively by these cartridges and without the need of complex injection systems satisfactorily consolidation can be obtained. Also the cartridges filled with isocyanate and the polyol component covered by this invention are part of the latter.

The process of the invention is especially suitable for the consolidation of geological formations encountered in coal mines. The advantages of the process covered by this invention may be set out by the following examples (definitions of the terms used are listed below):

Polyol 1:
  Polypropylene glycol with an average molecular weight of 425, an OH number of 265 and a viscosity of 71 mPa.s at 25° C., and m+n predominantly 7 (see above formula).

Polyol 2:
  Polypropylene glycol with an average molecular weight of 192, an OH number of 584 and a viscosity of 54 mPa.s at 25° C.; m+n predominantly 3.

Polyol 3:
  Polyetherpolyol on a trimethylolpropane and propylene oxide base, with an OH number of 370, an average molecular weight of 450, and a viscosity of 720 mPa.s at 25° C. (state of the art).

Polyol 4:
  Polyetherpolyol on a saccharose and propylene oxide basis, with an OH number of 380, an average molecular weight of 540, and a viscosity of 680 mPa.s at 25° C. (state of the art).

Castor oil:
  Commercial castor oil with an OH number of 172, average molecular weight of 930, and a viscosity of approx. 1000 mPa.s at 25° C. (state of the art).

Polyol 5:
  Polypropyleneglycol with an average molecular weight of 2500, an OH number of 59, and a viscosity of 410 mPa.s at 25° C.; n+m predominantly 33.

MDI:
  An isocyanate obtained by phosgenation of a formaldehyde/aniline condensate, consisting by approximately 50% of diisocyanatodiphenylmethane with an NCO-content of 31% and a viscosity of 140 mPa.s at 25° C.

Prepolymer:
  A polyurethane pre-adduct made up from 90 parts of MDI and 10 parts of polyol 5 with an NCO-content of 26.6% and a viscosity of 310 mPa.s at 25° C.

| Mixture | I | II | III | IV | V | VI | VII | VIII | XI | X |
|---|---|---|---|---|---|---|---|---|---|---|
| Polyol 1 | 100 | | 100 | 100 | | | | | | |
| Polyol 2 | | 100 | | | | | | | | |
| Polyol 3 | | | | | | | 100 | | 80 | |
| Polyol 4 | | | | | | 100 | | 100 | | 50 |
| Castor oil | | | | | | | | | 20 | |
| Polyol 5 | | | | | 100 | | | | | 50 |

-continued

| Mixture | I | II | III | IV | V | VI | VII | VIII | XI | X |
|---|---|---|---|---|---|---|---|---|---|---|
| MDI | 120 | 120 | 120 | | | 120 | 120 | 120 | 120 | 120 |
| Prepolymer | | | | 120 | 120 | | | | | |
| Water | 1 | 1 | 1 | 1 | 1 | 1 | 1 | 1 | 1 | 1 |
| Catalyst (dibutyl tin dilaurate) | | | 0,2 | | | 0,2 | | | | |
| Stabilizer | | | 0,4 | | | 0,4 | | | | |
| Agitating time till compatibility (sec) | 5 | 70 | 6 | 6 | 800 | 104 | 300 | 320 | 270 | 150 |
| Viscosity of the blend (mPa.s) | 85 | 91 | 83 | 106 | 310 | 380 | 386 | 480 | 420 | 450 |

EXAMPLE 1

Mixtures I to X as found in the above table were prepared. The amounts indicated refer to parts by wt. The components were stirred manually in beakers with wooden stirrers until compatibility marked by coming up of the homogeneous phase was reached. In case of the mixtures V to X a homogeneous emulsion built up only by partial reaction of the components within the stated mixing periods.

From the table may be seen that the mixtures covered by this invention (I–IV) exhibit definite advantages with the respect to the mixing properties and the viscosity of the polyol/polyisocyanate mixture, compared to the mixture which correspond to the present state of technology (V–X).

EXAMPLE 2

In a seam a draw-slate together with a 20 cm thick accompanying bed fell off. The 0.5 to 0.6 m thick dirt band fell of in large lumps over a length of up to 15 to 20 m. The draw-roof was to be consolidated by injection of 120 kg of polyurethane resin over a length of 20 m in order to prevent further roof fall. For trial, first the systems V to X were used. It was found that for injection of these systems exhibiting a viscosity of e.g. 450 mPa.s (25° C.) an injection pressure of 80 bar was necessary.

After injection of 40 kg of mixture the draw-roof including the accompanying bed was forced out of the strata compound—within the coal face area to be consolidated—and this resulted in further roof fall. Consolidation then was practised by the polyurethane system covered by this invention.

For the injection of this system into the zone of draw-roof to be consolidated an injection pressure of 18 bar was amply sufficient. At this pressure 120 kg of the system could be injected without roof fall, and satisfactory consolidation of the whole accompanying bed was obtained.

EXAMPLE 3

The road side of the gateroad used for a second retreat face was supposed to be consolidated by a mixture corresponding to the present state of technology (column VII) since, as a consequence of considerable strata disintegration, roof fall in the face end area seriously affected production, and since repeatedly accidents caused by fall of coal were reported. Fissures of up to 30 mm width had been observed.

In 3 m spacing boreholes were drilled 2.5 m deep. Through these boreholes the system as per column VIII of the table was injected. Satisfactory glueing effect was not obtained. Mineral fall continued. From resin samples taken from the strata the following conclusion could be drawn: due to insufficient intermixture of the polyol component and the polyisocyanate component the hardening and glueing effects were not sufficient.

By boreholes of the same depths drilled at the identical spacing the polyol/polyisocyanate blend as per column II, covered by this invention, was injected. Due to the excellent compatibility of both components intermixture was as required, and consolidation of the roof was obtained. Roof fall did not occur anymore.

EXAMPLE 4

For better organization of work in the vicinity of coal faces and for prevention of a roof fall in the face end area of a retreat face the gateroad side was to be consolidated as far ahead of the face area as possible. It was found that 50 m ahead of the face the rock strata were not yet sufficiently loosened by the abutment pressure to receive the necessary quantity of the known polyurethane consolidation system. At large borehole spacing (5 m) beginning 50 m ahead of the face the mixture corresponding to column V of the table was injected into the boreholes. At an injection pressure of 120 bar the boreholes took up only approx. 6 kg of the polyurethane system per meter of gateroad. When working through the zone treated in this way, it was found that the roof was not sufficiently consolidated. Further roof fall in the face end area was reported.

Again boreholes as specified above, starting 50 m ahead of the face, were drilled and mixture as per column III, covered by this invention, was injected into the strata at same injection pressure as previously the mixture V. The resin quantity taken up by the strata was of 25 to 30 kg per meter of gateroad. Roof fall when working through this zone was thus prevented.

EXAMPLE 5

An old brick-lined shaft was to be overhauled. Since water ran through the porous brick lining the shaft wall had to be sealed. The water coming off the brick lining exhibited a temperature of 11° to 13° C.

For sealing a mixture as per column IX was injected via 2 m deep boreholes drilled in 30 cm spacing. During injection already, first water, then a milk-coloured emulsion of water and polyol blend, and eventually MDI containing only small residual polyol quantities were discharged through the fissured brick lining. The MDI reacted with water and formed a brittle polyurea. Sealing was not achieved.

Then, the polyol blend as per column IV, covered by this invention, was injected. Initially some of the polyurethane foam was forced out, but then no water oozed out anymore from the brick-lining previously permeated by the polyisocyanate/polyol. Subsequently, 2 m deep boreholes were drilled in a 2 m-spacing pattern over a depth range of 25 m. The last-mentioned mixture was injected, and over the whole treated shaft section no further water inflow was recorded.

What we claim is:

1. A process for the consolidation of geological formations and artificial beds of rock, earth and coal by means of foaming and hardening polyisocyanate/polyol blends, wherein said polyol comprises a diol with secondary hydroxyl functions and having an OH number of about 150 to 1,000 and said polyisocyanate is liquid at room temperature and comprises crude MDI obtained by the phosgenation of aniline/formaldehyde condensation products or derivatives or prepolymers of said crude MDI which are liquuid at room temperature.

2. The process of claim 1, characterized in that diols of the formula

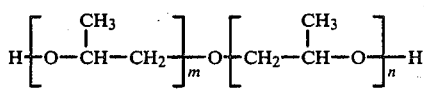

where m and n stand for an integral number from 1 to 12 and where the sum of m+n=2-13, are used.

3. The process of claim 1 or 2, characterized in that foaming agents comprising a member selected from the group consisting of monofluoro/trichloromethane, dichlorofluoromethane, methylene chloride, acetone, butane and pentane are added to the system or to the polyol in quantities of up to 30% by wt. as well as water in quantities of up to 3% by weight relative to the polyol.

4. The process of claim 1 or 2, characterized in that the blends are injected via boreholes or injection pipes into the geological formations to be consolidated at pressures ranging between 10 and 25 bar.

5. The process of claim 1 or 2 wherein said diol is blended with up to about 75% by weight, based on the total weight of polyol, of other ester- or ether-containing polyols.

6. The process of claim 1 or 2 which comprises adding accelerating catalysts in an amount of up to about 2% based on the weight of the polyol and polyisocyanate.

7. The process of claim 6 wherein said catalyst is a metallo-organic compound, a tertiary amine or mixtures thereof.

8. The process of claim 6 wherein said catalyst comprises dibutyl-tin dilaurate, tin octoate, triethylamine or mixtures thereof.

9. The process of claim 1 or 2 which comprises adding foam-stabilizing agents to the blend of polyisocyanate and polyol.

10. The process of claim 1 or 2 which comprises adding foam-stabilizing agents to the polyol.

11. A two-chamber cartridge containing polyisocyanate in one chamber and polyols in the other one, characterized in that the polyol component and the polyisocyanate component are made up according to claim 1 or 2.